(12) United States Patent
Cohoon et al.

(10) Patent No.: US 10,969,530 B1
(45) Date of Patent: *Apr. 6, 2021

(54) LIGHTING SYSTEMS

(71) Applicant: Apple Inc., Cupertino, CA (US)

(72) Inventors: Gregory A. Cohoon, Sunnyvale, CA (US); Clarisse Mazuir, San Jose, CA (US); Matthew E. Last, San Jose, CA (US)

(73) Assignee: Apple Inc., Cupertino, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/282,136

(22) Filed: Feb. 21, 2019

Related U.S. Application Data (63) Continuation of application No. 15/703,568, filed on Sep. 13, 2017, now Pat. No. 10,222,529.

(Continued)

(51) Int. Cl.
| | |
|---|---|
| *F21V 7/04* | (2006.01) |
| *F21V 8/00* | (2006.01) |
| *B60Q 3/64* | (2017.01) |
| *F21S 43/237* | (2018.01) |
| *F21S 43/245* | (2018.01) |
| *B60Q 3/208* | (2017.01) |
| *F21S 41/24* | (2018.01) |
| *B60Q 1/44* | (2006.01) |

(Continued)

(52) U.S. Cl.
CPC ............. *G02B 6/001* (2013.01); *B60Q 3/208* (2017.02); *B60Q 3/64* (2017.02); *F21S 41/24* (2018.01); *F21S 43/237* (2018.01); *F21S 43/245* (2018.01); *B60Q 1/04* (2013.01); *B60Q 1/30* (2013.01); *B60Q 1/44* (2013.01)

(58) Field of Classification Search
CPC .......... G02B 6/001; B60Q 3/64; B60Q 3/208; B60Q 1/30; B60Q 1/04; B60Q 1/44; F21B 41/214; F21B 43/237; F21B 43/245
USPC .................................................. 362/558, 307
See application file for complete search history.

(56) References Cited

U.S. PATENT DOCUMENTS

| | | | | |
|---|---|---|---|---|
| 5,353,133 | A | * 10/1994 | Bernkopf | .......... G02F 1/133621 |
| | | | | 349/10 |
| 5,771,810 | A | 6/1998 | Wolcott | |

(Continued)

OTHER PUBLICATIONS

Mazuir et al., U.S. Appl. No. 15/263,971, filed Sep. 13, 2016.
Mazuir et al., U.S. Appl. No. 15/221,376, filed Jul. 27, 2016.

*Primary Examiner* — Karl D Frech
(74) *Attorney, Agent, or Firm* — Treyz Law Group, P.C.; G. Victor Treyz; Michael H. Lyons (57) ABSTRACT

A lighting system may include one or more light sources and one or more light guides. A lighting system may be integrated into a window, a skylight, an exterior light such as a headlight, a tail light, or a high center-mounted stop light, or other exterior or interior portions of a system such as a vehicle. The light guide may be embedded in an adhesive layer in a vehicle structure. The light guide may be index-matched to the adhesive layer so that unilluminated portions of the light guide are indistinguishable from the vehicle structure. The light guide may be formed from optical fibers. The optical fibers may include a light-scattering optical fiber that scatters light out of the vehicle structure. The light-scattering optical fiber may be fused to a non-scattering optical fiber that guides light from a light source to the light-scattering optical fiber.

20 Claims, 11 Drawing Sheets

Related U.S. Application Data (60) Provisional application No. 62/397,076, filed on Sep. 20, 2016.

(51) Int. Cl.
*B60Q 1/30* (2006.01)
*B60Q 1/04* (2006.01)

(56) References Cited

U.S. PATENT DOCUMENTS

| | | |
|---|---|---|
| 6,025,775 A | 2/2000 | Erlandson |
| 6,446,375 B1 | 9/2002 | Davis |
| 6,553,130 B1 | 4/2003 | Lemelson et al. |
| 7,084,859 B1 | 8/2006 | Pryor |
| 7,493,202 B2 | 2/2009 | Demro et al. |
| 7,612,933 B2 | 11/2009 | Djordjev |
| 8,000,091 B2 | 8/2011 | Shinn et al. |
| 8,031,168 B2 | 10/2011 | Feenstra et al. |
| 8,333,492 B2 | 12/2012 | Dingman et al. |
| 8,344,870 B2 | 1/2013 | Evans et al. |
| 8,625,060 B2 | 1/2014 | Wang et al. |
| 8,730,154 B2 | 5/2014 | Dean et al. |
| 8,780,437 B1 | 7/2014 | Lo et al. |
| 8,836,494 B2 | 9/2014 | Reuschel et al. |
| 10,222,529 B1 * | 3/2019 | Cohoon ................ F21S 43/245 |
| 2004/0017687 A1 | 1/2004 | Misaras |
| 2006/0254142 A1 | 11/2006 | Das et al. |
| 2007/0049147 A1 | 3/2007 | Hill et al. |
| 2008/0211652 A1 | 9/2008 | Cope et al. |
| 2011/0106334 A1 | 5/2011 | Filev et al. |
| 2012/0001842 A1 | 1/2012 | Stellbrink |
| 2012/0081777 A1 | 4/2012 | Heikenfeld et al. |
| 2013/0301287 A1 | 11/2013 | Schlemmer |
| 2014/0211498 A1 | 7/2014 | Cannon et al. |
| 2017/0334342 A1 | 11/2017 | Dellock et al. |

\* cited by examiner

LIGHTING SYSTEMS

This application is a continuation of U.S. patent application Ser. No. 15/703,568, filed Sep. 13, 2017, which claims priority to provisional patent application No. 62/397,076, filed Sep. 20, 2016, each of which is hereby incorporated by reference herein in its entirety.

FIELD

This relates generally to lighting systems and, more particularly, to lighting systems that can blend in with surrounding structures.

BACKGROUND

Systems such as vehicles generally have lighting systems. Lighting systems in vehicles include interior lighting for providing aesthetic lighting and informative visual output and exterior lighting such as head lights and tail lights.

Existing lighting systems are generally visible to a user even when the lighting system is unilluminated. The visible presence of a lighting system in a vehicle may be aesthetically appealing or may prevent other objects from being visible through the lighting system.

SUMMARY

A lighting system may include one or more light sources and one or more light guides. A lighting system may be integrated into a window, a skylight, an exterior light such as a headlight, a tail light, or a high center-mounted stop light, a door panel, a dashboard, or other interior or exterior portions of a system such as a vehicle.

The light guide may be embedded in a polymer layer in a vehicle structure. The light guide may be index-matched to the polymer layer so that unilluminated portions of the light guide are transparent and indistinguishable from the vehicle structure.

The light guide may be formed from one or more optical fibers. The optical fibers may include a light-scattering optical fiber that scatters light out of the vehicle structure towards the interior or exterior of the vehicle. The light-scattering optical fiber may be fused to a non-scattering optical fiber that guides light from a light source to the light-scattering optical fiber.

Further features will be more apparent from the accompanying drawings and the following detailed description.

DETAILED DESCRIPTION

Figure 1:
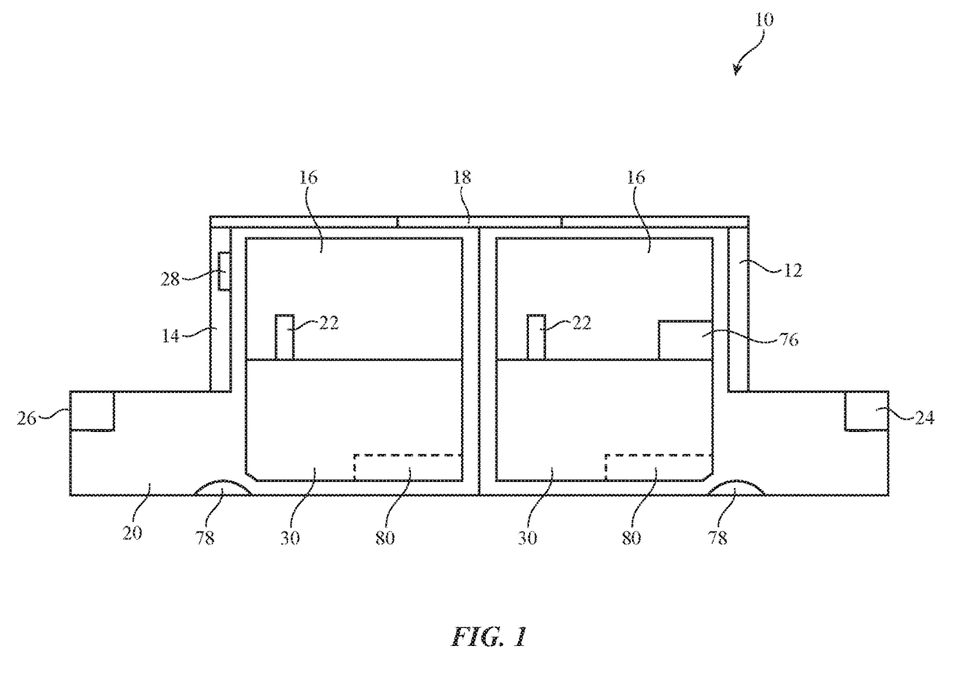
FIG. 1 is a side view of a portion of an illustrative vehicle in accordance with an embodiment.

An illustrative system of the type that may be provided with illumination is shown in FIG. 1. System 10 may be a vehicle, a kiosk, a room in an office or other building, or other environment that includes lighting. Illustrative configurations in which system 10 is a vehicle may sometimes be described herein as an example.

As shown in FIG. 1, system 10 may include windows such as front window 12, rear window 14, side windows 16, and one or more top windows 18 (e.g., a skylight) that are mounted in body 20. Body 20 may have doors 30. The surfaces of doors 30 may sometimes be referred to as door panels and face the interior of body 20. Dashboard 76 may be located in front of seats 22. Buttons, dials, and other components may be provided on dashboard 76 and elsewhere in system 10 and may be provided with illumination from a lighting system. Footwells 80 may be covered with carpeting or other suitable material.

Illumination may be provided in system 10 to illuminate the interior of system 10 and/or to illuminate the exterior of system 10. As examples, interior lighting may be provided on windows of system 10 (e.g., front window 12, rear window 14, skylight window 18, side windows 16, or other suitable windows), the interior surface of doors 30 (e.g., on door panels), in footwells 80 (e.g., in the carpet or other material in footwells 80), on dashboard 76 (e.g., locations associated with input-output components and/or other portions of dashboard 76), on horizontal areas (seating surfaces) of seats 22, on the front of rear of seatbacks in seats 22, on the front or rear of headrests on seats 22, on a headliner (e.g., on the interior of a vehicle roof), on interior surfaces of A pillars, B pillars, C pillars, or other structural components), on seatbelts, on a steering wheel, on an arm rest or console between seats 22, on an arm rest on doors 30, on mirrors, on rear seat footwells or other portions of the floor of system 10, or any other interior surfaces of system 10.

Lighting may also be provided on the exterior of vehicle 10. For example, side mirrors may be formed on the left and right sides of vehicle 10 and may include light-based output devices such as light-emitting diodes. Vehicle 10 may also be provided with lights on the rear of vehicle 10 such as rear lights 26 (e.g., turn signal lights, brake lights, tail lights, etc.). Rear lighting may also be provided on rear window 14 and/or other portions of the rear of vehicle 10. The rearward facing lighting of vehicle 10 may include center high mounted stop lamps (CHMSL) such as light 28. Light 28 may emit light through rear window 14 or may be mounted on other rear portions of vehicle 10. Additional lights in vehicle 10 such as lights 24 may include headlights, turn signal lines, and fog lights. In general, lighting may be provided on any interior and/or exterior surface of vehicle 10 such as the roof of vehicle 10, the rear window or other rear surfaces of vehicle 10, the front window or other front surface of vehicle 10, the doors or other side surface of vehicle 10, protruding portions of vehicle 10 such as mirrors or bumpers, or any other vehicle surface. The lighting for vehicle 10 may be provided using light-based devices (light sources) that have been mounted on the surface of vehicle 10 (e.g., on body 20, inside a portion of body 20, in body 20 in an arrangement where the exterior of the light-based devices is flush with the surface of body 20, etc.) and/or using lighting that emits light through windows 12, 14, 16, and/or 18.

Figure 2:
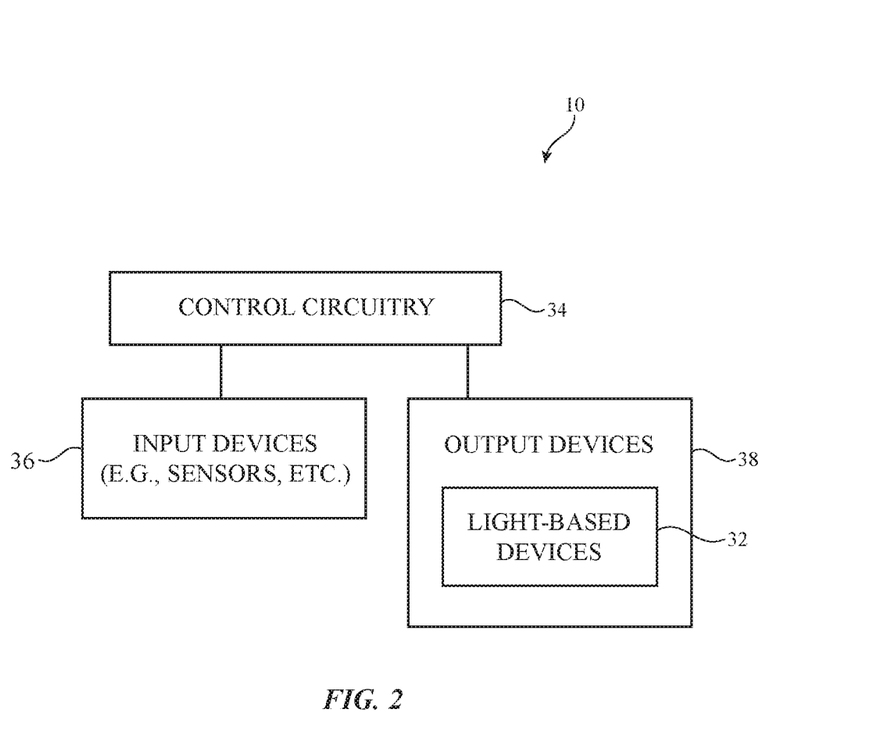
FIG. 2 is a schematic diagram of an illustrative system with lighting in accordance with an embodiment.

FIG. 2 is a schematic diagram of an illustrative system with lighting. As shown in FIG. 2, system 10 may include control circuitry 34. Control circuitry 34 may include one or more microprocessors, application-specific integrated circuits, digital signal processors, microcontrollers, or other processing circuitry. Control circuitry 34 may also include storage such as volatile and non-volatile memory, solid state drives, hard disk drives, and removable storage media. During operation of device 10, control circuitry 34 may process data and take suitable actions in response. Data may be gathered from circuitry 34 (e.g., clock information, status information on the current operating state of system 10, etc.) and may be gathered from input devices 36. Based on the data that is processed by control circuitry 34, control circuitry 34 may use electrical components such as output devices 38 to take actions such as displaying visual output for a user of system 10 with a lighting system in devices 38, presenting audio output to the user, adjusting an electromechanical actuator (e.g., to adjust steering, braking, etc.), controlling a motor (e.g., to position a seat), etc.

Input devices 36 may include force sensors. For example, devices 36 may include force sensors based on strain gauges, force sensors based on piezoelectric materials, force sensors based on compressible resistive foam, capacitive force sensors (e.g., force sensors based on collapsible foam, fabric with conductive strands that serve as capacitive electrodes, or other capacitive force sensor structures), or other force sensor structures that detect applied force such as applied force from the fingers (or other body part) of a user. Devices 36 may include one or more proximity sensors that detect when a user's fingers (or other body part) or other external object is in the vicinity of the proximity sensor. The proximity sensors may include light-based proximity sensors formed using light emitters (e.g., infrared light-emitting diodes) and corresponding light detectors (e.g., infrared light detectors that detect infrared light from the infrared light-emitting diodes that have been reflected off of nearby objects), may include capacitive proximity sensors (e.g., sensors with capacitive proximity sensor electrodes that make capacitance measurements to detect when objects are nearby), may be acoustic proximity sensors, and/or may be other types of proximity sensors. Input devices 36 may also include touch sensors. The touch sensors may be based on acoustic touch technology, light-based touch technology, resistive touch, force-based touch, or other touch technologies. As an example, the touch sensor(s) may be capacitive touch sensors having capacitive touch sensor electrodes such as electrodes formed from strands of conductive material in a fabric, electrodes formed from strips of metal or other conductive material on dielectric substrates, or electrodes formed from conductive pads with other configurations. Input devices 36 may also include environmental sensors (e.g., gas sensors, humidity sensors, temperature sensors, particulate sensors, etc.), keyboards and other devices with one or more keys or other buttons, accelerometers, magnetic sensors, compasses, pressure sensors (e.g., air pressure sensors and/or force sensors), touch sensors in displays, microphones to gather voice commands and other audio input, and other input components.

Output devices 38 may include devices for presenting audio output (e.g., speakers, tone generators, etc.), may include vibrators and other haptic devices, and other components for presenting information to a user. Output devices 38 may also include light-based devices 32 for generating visible output. Light-based devices 32 may include displays (e.g., light sources with arrays of individually controlled pixels such as liquid crystal displays, organic light-emitting diode displays, projector displays, etc.), status indicator lights, and gauges to display navigation system information, media system information, vehicle status information, and other information in the interior of vehicle 10. Light-based devices 32 may include external lighting for providing light-based output outside of vehicle 10 (e.g., displays that emit light externally and/or other light sources that emit light in exterior areas of vehicle 10). In general, light-based devices 32 may include any suitable light sources that produce light in response to applied electrical signals such as lamps, light-emitting diodes, plasma display panel pixels, illuminated status indicators, displays, lasers, arrays of light sources, individual light sources, backlight units for displays, backlit or edge-lit light guides, light sources that emit one or more beams of light (e.g., a laser beam, light-emitting diode beam, or a beam associated with another collimated light source), light sources that emit light in a fixed pattern of one or more beams, light sources that emit light using raster scanning techniques, light sources that emit steerable beams (e.g., light sources with mirror arrays to steer light in a light projector system, light sources with one or more steerable mirrors, steerable lasers and light-emitting diodes, etc.), image projecting systems and other light projectors, light guide panels that contain light extraction features that cause the light guide panels to emit light in various patterns, and other electrically controlled light sources.

Light-based devices 32 may contain individually controlled areas. These areas may be relatively small areas that serve as pixels in an array of pixels for a display-type output device (e.g., a display integrated into a dash-mounted navigation and media system or an external portion of vehicle 10). Light-based devices 32 may also include components that include one or only a few larger individually controlled areas (e.g., one or more areas of about 1-100 cm$^2$, 10-1000 cm$^2$, 100-1,000,000 cm$^2$, more than 1000 cm$^2$, less than 500 cm$^2$, etc.). For example, light-based devices 32 may contain light-producing devices that produce a single block of light over entire windows in vehicle 10 or other large areas of vehicle 10. Individually controlled areas may be used to display fixed icons or other shapes, adjustable (e.g., customizable) icons or other shapes, fixed text (e.g., "stopping" to indicate the vehicle 10 is stopping, "road hazard ahead" to indicate that dangerous road conditions are in the road ahead, "fog ahead" to indicate that there is fog in the road ahead, "22 mph" to indicate that vehicle 10 is travelling at 22 mph, "closing speed is 22 mph" to indicate that a vehicle following vehicle 10 is closing in on vehicle 10 at a relative speed of 22 mph, etc.), customizable text, time-varying text, scrolling text, blinking text, and/or output of other shapes. The light output produced by light-based devices 32 may have multiple adjustable attributes (e.g., color, shape, intensity, duration, location, etc.) and any set of one or more of these attributes may be used in conveying information to a viewer.

During operation, control circuitry 34 may generate control signals that direct a lighting system to generate output light (e.g., images, ambient lighting, lighting to adjust the aesthetic appearance of a structure in system 10 by illuminating an interior surface of system 10 with a decorative pattern, virtual speedometers and other vehicle gauges, media playback information panels and other information regions, exterior illumination, etc.).

Light-based devices 32 may be based on light-emitting diodes, lasers, or other sources of light. In some configurations, light-based devices 32 may be formed from light-emitting diodes or other light sources mounted adjacent to curved mirrors within clear plastic housings or other mounting structures (e.g., when forming headlights, etc.). If desired, light-based devices 32 may also have thin planar shapes (e.g., when light-based devices 32 are being mounted to windows 12, 14, 16, and/or 18, or over relatively large surface areas on body 20 of vehicle 10). For example, light-based devices 32 may include flexible or rigid light-emitting panels formed from edge-lit light guide films, organic light-emitting diode substrates, backlit liquid crystal displays, or other planar light sources. Light-based devices 32 (e.g., light-emitting panels or other light sources) may be opaque or transparent. Opaque structures associated with light-based devices 32 may be used on portions of vehicle 10 such as opaque portions of body 20 or on portions of windows 12, 14, 16, and/or 18 that can be obscured without interfering with the fields of view of the occupants of vehicle 10. Transparent light-based devices 32 may be placed on transparent portions of vehicle 10 such as portions of windows 12, 14, 16, and/or 18. When not emitting light, transparent devices will not block the views of the occupants of vehicle 10.

Light-based devices 32 may, if desired, include light guiding structures such as optical fibers and/or other light guiding elements. Light guides in devices 32 may be used to guide light from a light source to a location in vehicle 10 where illumination is desired. Light guides in devices 32 may, in some arrangements, be transparent and may blend in with a surrounding portion of vehicle 10 (e.g., to generate a uniform appearance). For example, light guides in devices 32 may be embedded in or attached to a transparent surface in vehicle 10 (e.g., a window, a skylight, a transparent cover for an exterior light such as a headlight, a brake light, a tail light, etc., or other suitable transparent or semi-transparent surface). The light guide may be index-matched to the surrounding transparent structure and may therefore be invisible to the human eye when the light source is off (e.g., a user may be able to look through the transparent structure without detecting the light guide or light source) and/or when the light is propagating through a non-scattering portion of the light guide.

Figure 3:
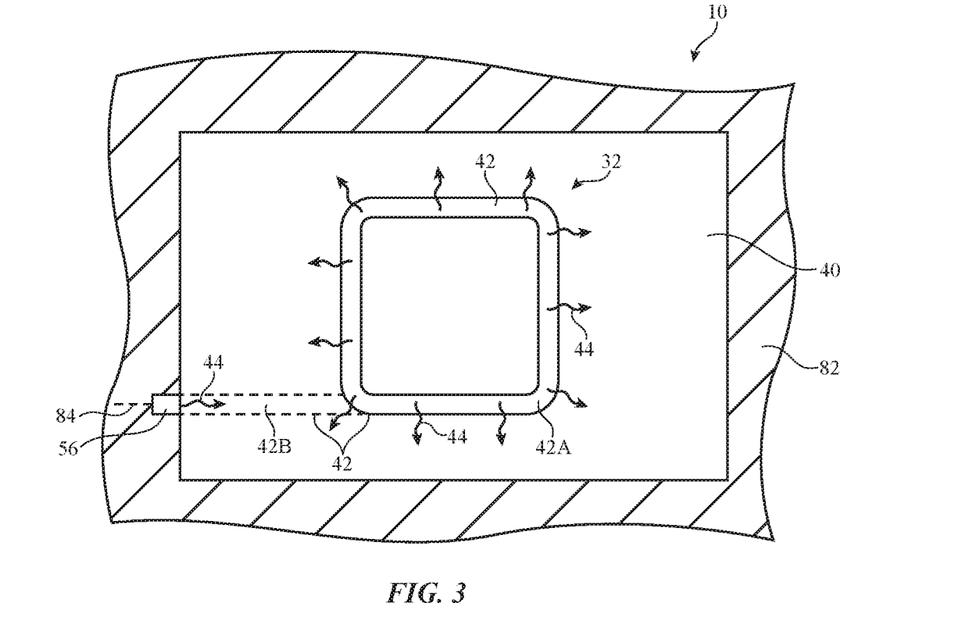
FIG. 3 is a front view of an illustrative illumination system having a light guide embedded in a vehicle structure in accordance with an embodiment.
Figure 4:
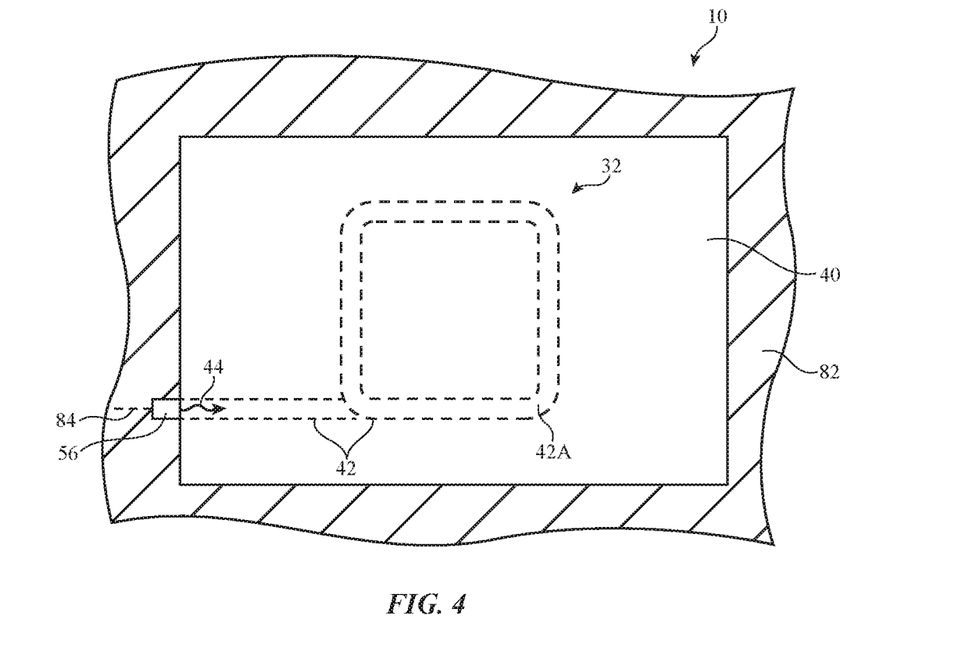
FIG. 4 is a front view of the illumination system of FIG. 3 in an unilluminated state in accordance with an embodiment.

FIGS. 3 and 4 show an illustrative illumination system that blends in with a surrounding structure in vehicle 10. In FIG. 3, illumination system 32 is in an illuminated state (an "on" state), and in FIG. 4, illumination system 32 is in an unilluminated state (an "off" state).

Illumination system 32 may be incorporated into a portion of vehicle 10 such as vehicle structure 40. Structure 40 may be a transparent structure or an opaque structure. As an example, structure 40 may be a transparent structure such as a portion of a window (e.g., front window 12, rear window 14, side window 16, skylight 18, or other suitable window), a transparent cover for an exterior light (e.g., headlight 24, tail light 26, a center high-mount stop light such as light 28, or other suitable exterior light), a transparent cover for an interior surface of vehicle 10, or other suitable transparent structure in vehicle 10. Arrangements where structure 40 is an opaque structure in vehicle 10 (e.g., an opaque portion of body 20, dashboard 76, or other structure in vehicle 10) may also be used. Structure 40 may be mounted to a surrounding support structure such as body 82 (e.g., a portion of vehicle body 20 or other suitable support structure). Arrangements in which vehicle structure 40 is transparent are sometimes described herein as an example. Illumination system 32 may be mounted on the inside or outside of structure 40, may be embedded within structure 40, may be mounted on or embedded in an opaque body surface of vehicle 10, or may be mounted elsewhere in vehicle 10.

As shown in FIG. 3, illumination system 32 may include a light source such as light source 56 and one or more light guides such as light guide 42. In the example of FIG. 3, light source 56 is mounted to body 82 and light guide 42 is mounted to vehicle structure 40. Illumination system 32 may be used to supply ambient lighting, decorative lighting (e.g., illuminated trim, surfaces with aesthetically pleasing decorative patterns), exterior lighting (headlights, etc.), or other types of illumination. Control circuitry 34 (FIG. 2) may issue control signals on path 84 that determine the amount of light 44 that is emitted by light source 56. Light source 56 may be any suitable light source that produces light in response to applied electrical signals (e.g., one or more light-emitting diodes, lasers, or other light sources).

As shown in FIG. 3, light-emitting diode 56 may emit light 44 into light guide 42. Light guide 42 may be a fiber, a molded plastic structure, or other light guiding structure that guides light internally in accordance with the principle of total internal reflection. Light guide 42 may be formed from clear plastic, glass, sapphire or other transparent crystalline materials, or other transparent materials. In some configurations, light guides 42 may have inner structures (sometimes referred to as cores) that are coated with one or more outer layers (sometimes referred to as claddings or coating layers). In this type of arrangement, the core may have a higher index of refraction than the cladding to promote total internal reflection of the light that has been coupled into light guide 42. High/low index of refraction arrangements may also be created by embedding a light guide structure of a first index of refraction into a transparent material of a second index of refraction that is higher than the first index of refraction. The transparent material into which the light guide structure is embedded may be a polymer or other clear binder.

In general, light guides 42 may be formed by injection molding, by machining plastic light guide structures, by dipping or spraying polymer coatings onto machined or molded plastic core parts or glass core parts, by extruding polymers, by elongating glass or plastic rods using heat and tension, or by otherwise forming structures that can internally guide light within vehicle structure 40 or other part of vehicle 10. With one suitable arrangement, which may sometimes be described herein as an example, light guides 42 are formed from optical fibers. The fibers may have circular cross-sectional shapes with central cores surrounded by cladding layers of lower index of refraction material. The fibers may be formed form glass, plastic, or other transparent material. Arrangements in which light guides 42 have noncircular cross-sectional shapes may also be used. In the example of FIGS. 3 and 4, fibers 42 are configured to emit light 44 at discrete locations across vehicle structure 40.

Light guides such as light guide 42 may have one or more light-scattering portions such as portion 42A and one or more non-scattering portions such as portion 42B. In light-scattering portions 42A, light guide 42 may have light extraction features such as particles, changes in refractive index, roughened surfaces, protrusions such as bumps or ridges, recesses such as pits or grooves, or other light extraction features. In the presence of light extraction features in portion 42A of light guide 42, light 44 from the interior of light guide 42 may be scattered out of light guide 42. For this reason, light-scattering portions 42A of light guide 42 may sometimes be referred to as illuminable portions 42A (which may be illuminated or unilluminated depending on whether light source 56 is on or off). In non-scattering portions of light guide 42 such as portion 42B, light guide 42 may be free of light extraction features so that light 44 propagates through and is contained within light guide 42 via total internal reflection. Because light does not escape from non-scattering portions 42B, portions 42B may sometimes be referred to as unilluminated portions 42B. If desired, light-scattering portions 42A and non-scattering portions 42B may be joined via a fusion splice.

Light guides in illumination system 32 such as light guide 42 may, if desired, be transparent such that users are able to see through light guide 42 when light guide 42 is unilluminated and/or when portions of light guide 42 are unilluminated. Unilluminated portions of light guide 42 (e.g., portions of light guide 42 where no light is present and portions in which light is present but not escaping from light guide 42) may therefore blend in with vehicle structure 40. As shown in the illuminated state FIG. 3, for example, non-scattering portion 42B contains light 44 within light guide 42 and blends in with the surrounding portion of vehicle structure 40. Illuminated portion 42A, on the other hand, scatters light 44 outwards (e.g., towards a passenger or other individual) and therefore stands out visibly from vehicle structure 40.

In arrangements where vehicle structure 40 is opaque, unilluminated portions of light guide 42 may blend in with the surrounding opaque material of structure 40. In arrangements where vehicle structure 40 is transparent, unilluminated portions of light guide 42 may blend in with the surrounding transparent material of structure 40. With this type of arrangement, light may pass through structure 40 and light guide 42. This may allow a driver or other occupant of vehicle 10 to look out of vehicle 10 through structure 40 (e.g., through a window on which illumination system 32 is mounted and through illumination system 32) to see objects on the other side of vehicle structure 40.

If desired, light guide 42 may be index-matched with the surrounding material of vehicle structure 40. With this type of arrangement, a user will be unable to detect unilluminated portions of light guide 42 in vehicle structure 40. For example, unilluminated portion 42B in FIG. 3 may be undetectable to the human eye (e.g., may be indistinguishable from vehicle structure 40), even when portion 42A is illuminated. Illuminated portion 42A may therefore appear to be "floating" in the middle of vehicle structure 40. In the off state of FIG. 4, the entirety of light guide 42 may be unilluminated and may be invisible to a user (e.g., indistinguishable from vehicle structure 40), making vehicle structure 40 appear completely clear and uniform.

In the example of FIGS. 3 and 4, light-scattering portion 42A of light guide 42 forms a rectangle with rounded corners. Thus, when illuminated with light 44, an illuminated rectangle with rounded corners may appear to be "floating" in the middle of vehicle structure 40 since non-scattering portion 42B remains transparent and unilluminated even when illumination system 32 is turned on. The shape of FIGS. 3 and 4 is merely illustrative, however. If desired, illuminated portion 42A of light guide 42 may form other illuminated shapes such as circles, ovals, parallel lines, triangles, text, symbols, and/or any other suitable shape or pattern. Arrangements in which multiple illuminated shapes are formed (e.g., separated from one another by non-illuminated regions 42B) may also be used.

Figure 5:
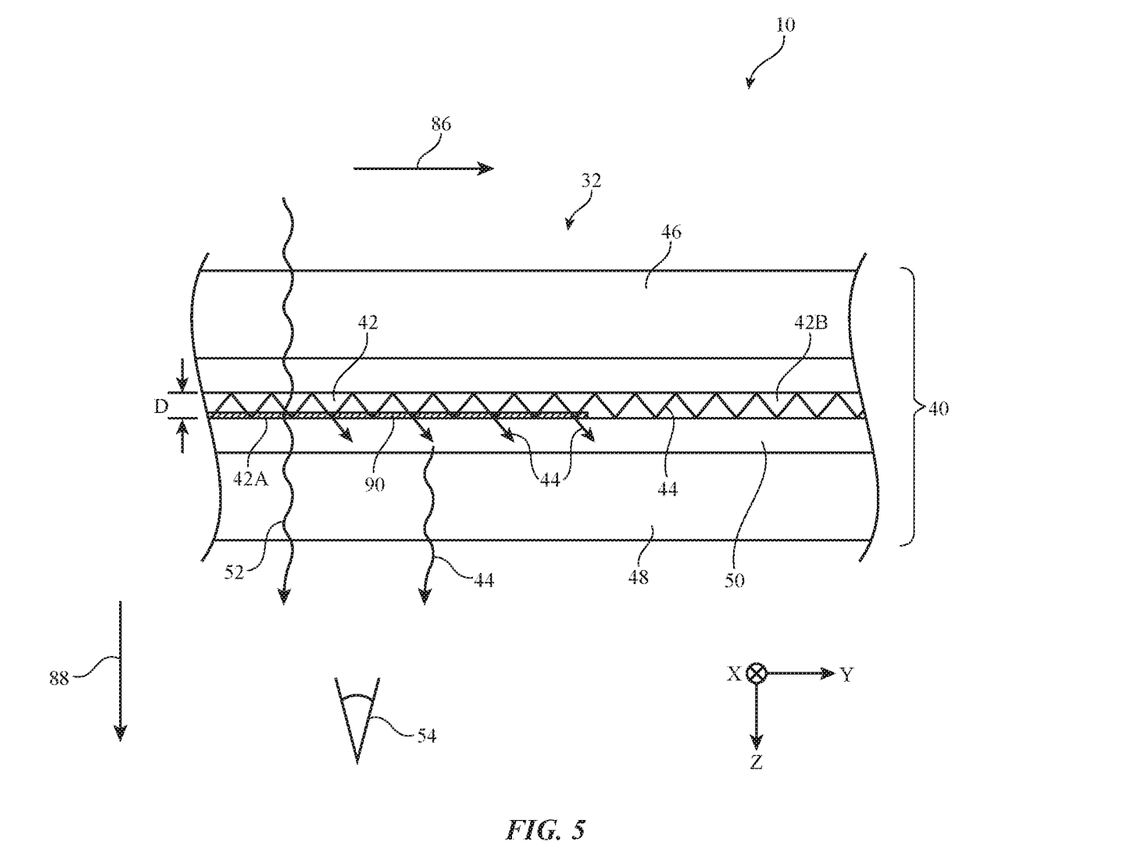
FIG. 5 is a cross-sectional side view of an illustrative illumination system having a light guide embedded in a polymer layer in a vehicle structure in accordance with an embodiment.

FIG. 5 shows a cross-sectional side view of an illustrative illumination system having a light guide of the type shown in FIGS. 3 and 4. In the example of FIG. 5, vehicle structure 40 is a laminated structure including first and second layers 46 and 48 that are laminated together with a polymer layer such as polymer layer 50. Layers 46 and 48 may be formed from glass, sapphire, diamond-like materials, plastics such as polycarbonate, or other clear materials. Polymer layer 50 may be an optically clear adhesive such as polyvinyl butyral (PVB), ethylene-vinyl acetate (EVA), polyurethane, other suitable resin or adhesive. In one illustrative arrangement, which is sometimes described herein as an example, vehicle structure 40 may be laminated safety glass. This is, however, merely illustrative. If desired, one or more of layers 46 and 48 may be opaque or only partially transparent. In some arrangements, layer 46 (e.g., the layer that forms a "background" for illumination 44 because light 44 is emitted away from layer 46) may be a matte material, an ultra-black material, a light-absorbing material, a light-reflective material (e.g., a mirror), a light-scattering material, or other material. Layers 46 and 48 need not be planar, as shown in the example of FIG. 5. If desired, one or more of layers 46 and 48 may be curved or may have curved portions.

As shown in FIG. 5, light guide 42 may be embedded in polymer layer 50. In the example of FIG. 5, light guide 42 includes light-scattering portion 42A that receives light 44 (e.g., directly from a light source or from a non-scattering portion of light guide 42) and guides light 44 so that it propagates in direction 86 (e.g., parallel to the y-axis of FIG. 5). In light-scattering portion 42A, light guide 42 may have light extraction features 90 (e.g., a change in refractive index, roughened surfaces, protrusions such as bumps or ridges, recesses such as pits or grooves, embedded particles, or other light extraction features) that allow some of light 44 to escape in direction 88 (e.g., parallel to the z-axis of FIG. 5) towards viewer 54. In non-scattering portion 42B, light guide 42 may be free of light extraction features 90 so that light 44 propagates in direction 86 without escaping light guide 42. Light guide 42 may have a diameter D between 140 microns and 170 microns, between 150 microns and 200 microns, between 100 microns and 130 microns, between 150 microns and 180 microns, less than 140 microns, or greater than 140 microns.

In arrangements where illumination system 32 is an exterior lighting system, layer 46 may face the interior of vehicle 10 and layer 48 may face the exterior of vehicle 10 so that light 44 is emitted away from vehicle 10 towards viewer 54 (e.g., a viewer that is outside of vehicle 10). In arrangements where illumination system 32 is an interior lighting system, layer 46 may face the exterior of vehicle 10 and layer 48 may face the interior of vehicle 10 so that light 44 is emitted towards the interior of vehicle 10 towards viewer 54 (e.g., a viewer that is inside of vehicle 10).

If desired, light guide 42 and polymer layer 50 may have matching or nearly matching indices of refraction. For example, the index of refraction of light guide 42 may be within 3% 5%, 10%, 15%, 20%, 30%, or 40% of the index of refraction of polymer layer 50. In one illustrative example, polymer layer 50 may have an index of refraction of about 1.478 and light guide 42 may have an index of refraction of about 1.43. This is merely illustrative, however. Polymer layer 50 and light guide 42 may have other indices of refraction, if desired. By matching or almost matching the refractive index of light guide 42 to that of polymer layer 50, unilluminated portions of light guide 42 may be invisible. For example, non-scattering portion 42B may be invisible to users (e.g., indistinguishable from vehicle structure 40), and light-scattering portion 42A may only be visible when illuminated.

Figure 6:
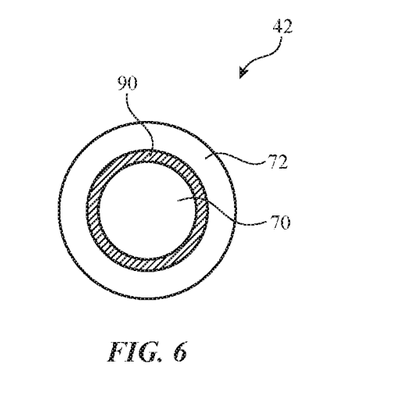
FIG. 6 is a cross-sectional side view of an illustrative light guide having a fiber core surrounded by cladding in accordance with an embodiment.

FIGS. 6-11 show cross-sectional side views of illustrative light guides that may be used in illumination system 32. In the example of FIG. 6, light guide 42 is formed from an optical fiber having a core such as core 70 that is surrounded by a protective layer such as cladding 72. Optical fiber 42 may have light-scattering features 90 along its length. Light-scattering features 90 may be formed at uniform discrete locations along the length of fiber 42, may be formed at pseudorandom discrete locations along the length of fiber 42, or may be formed continuously along the length of fiber 42. Light-scattering features 90 may be formed from any suitable structures that locally defeat the total internal reflection within fiber 42 (e.g., pits, bumps, scratches or other grooves, ridges, particles with a different refractive index, local changes in fiber shape and/or diameter, changes in cladding material and/or index of refraction, abrupt bends, etc.). In the presence of light scattering features 90, light from light source 56 (FIG. 3) may be scattered outwards towards a user.

If desired, cladding 72 may be formed from the same material as polymer layer 50 (FIG. 5). For example, cladding 72 and polymer layer 50 may both be formed from polyvinyl butyral (PVB), ethylene-vinyl acetate (EVA), polyurethane, other suitable resin or adhesive. By forming polymer layer 50 and cladding 72 from the same material, the difference in refractive index between cladding 72 and polymer layer 50 will be minimized and unilluminated portions of fiber 42 will be undetectable in vehicle structure 40. This is, however, merely illustrative. If desired, cladding 72 and polymer layer 50 may be formed from different materials.

Figure 7:
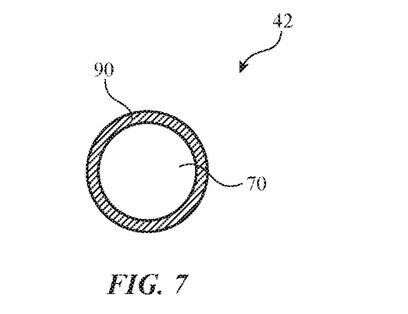
FIG. 7 is a cross-sectional side view of an illustrative light guide having a fiber core in accordance with an embodiment.

If desired, fibers 42 may not include a cladding, as shown in the example of FIG. 7. With this type of arrangement, light-scattering features 90 may be formed from a difference in refractive index between core 70 and polymer layer 50, or may be formed from pits, bumps, scratches or other grooves, ridges, particles with a different refractive index, local changes in fiber shape and/or diameter, abrupt bends, etc.

Figure 8:
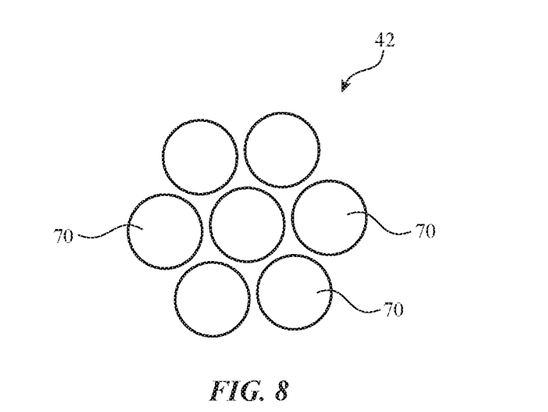
FIG. 8 is a cross-sectional side view of an illustrative light guide formed from a bundle of optical fibers in accordance with an embodiment.

FIG. 8 shows how light guide 42 may be formed from a bundle of optical fiber cores 70. Optical fiber cores 70 may be free of cladding, as shown in the example of FIG. 8, or some or all of fiber cores 70 may have cladding (e.g., individual cladding the surrounds individual fiber cores 70 or a collective cladding that surrounds multiple fiber cores 70).

Figure 9:
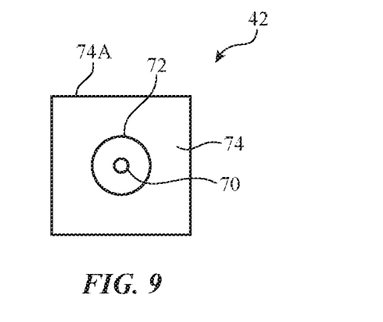
FIG. 9 is a cross-sectional side view of an illustrative light guide having an optical fiber surrounded by a buffer layer with straight sides in accordance with an embodiment.

FIG. 9 shows how light guide 42 may include a buffer layer such as buffer layer 74. Buffer layer 74 may be formed from fluoropolymer such as, polyurethane, polytetrafluoroethylene, polyvinylidene fluoride, or other polymer material. If desired, buffer layer 74 may be formed from the same material as polymer layer 50. For example, buffer 74 and polymer layer 50 may both be formed from polyvinyl butyral (PVB), ethylene-vinyl acetate (EVA), polyurethane, other suitable resin or adhesive. By forming polymer layer 50 and buffer 74 from the same material, the difference in refractive index between buffer 74 and polymer layer 50 will be minimized and unilluminated portions of fiber 42 will be undetectable in vehicle structure 40. This is, however, merely illustrative. If desired, buffer 74 and polymer layer 50 may be formed from different materials. Optical fiber cores 70 may include cladding 72, as shown in the example of FIG. 9, or fiber cores 70 may be free of cladding.

In the example of FIG. 9, buffer 74 has a rectangular cross-section. With this type of arrangement, the outer surfaces of buffer 74 may be used to help align fiber core 70 within polymer layer 50. For example, the light-emitting surface of optical fiber 70 may face surface 74A of buffer 74. When placing light guide 42 in polymer layer 50, the light-emitting surface of core 70 may face a particular direction by orienting surface 74A of buffer 74 towards that direction in polymer layer 50.

Figure 10:
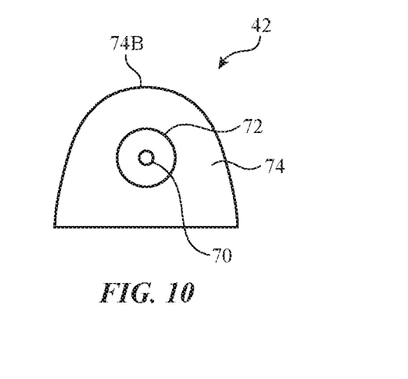
FIG. 10 is a cross-sectional side view of an illustrative light guide having an optical fiber surrounded by a buffer layer with curved sides in accordance with an embodiment.

In the example of FIG. 10, buffer 74 has a curved outer surface such as curved outer surface 74B. The shapes of FIGS. 9 and 10 are merely illustrative, however. If desired, buffer 74 may have an oval cross-section, a circular cross-section, a triangular cross-section, or any other suitable cross-sectional shape.

Figure 11:
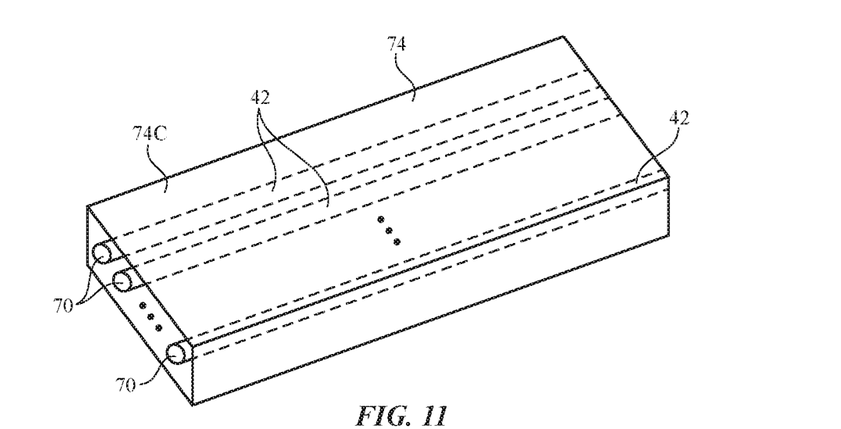
FIG. 11 is a perspective view of illustrative light guides grouped together in a common buffer layer in accordance with an embodiment.

If desired, buffer 74 may surround multiple fibers 70. This type of arrangement is shown in FIG. 11. As shown in FIG. 11, multiple fibers 70 may be embedded in buffer 74. Fibers 70 may be parallel to one another or may have non-parallel orientations. With this type of arrangement, the outer surfaces of buffer 74 may be used to help align multiple fiber cores 70 within polymer layer 50. For example, the light-emitting surfaces of optical fibers 70 may face surface 74C of buffer 74. When placing light guides 42 in polymer layer 50, the light-emitting surfaces of cores 70 may face a particular direction by orienting surface 74C of buffer 74 towards that direction in polymer layer 50.

The examples of FIGS. 6-11 in which light guides 42 have fiber cores with cross-sectional shapes are merely illustrative. If desired, light guides 42 may include fibers with non-circular cross-sectional shapes (e.g., rectangular, triangular, polygonal, oval, trilobal, or any other suitable cross-sectional shape).

Figure 12:
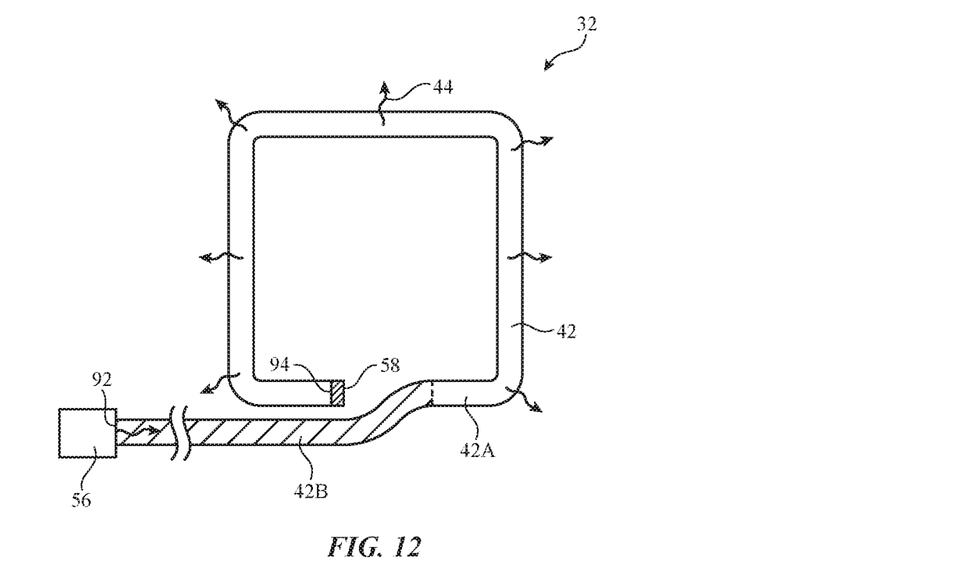
FIG. 12 is a front view of an illustrative illumination system having a non-scattering optical fiber that guides light to a light-scattering optical fiber with a reflective end in accordance with an embodiment.

FIG. 12 shows an illustrative arrangement for illumination system 32 in which one end of light guide 42 has a reflective surface to increase the homogeneity and light extraction efficiency of light guide 42. As shown in FIG. 12, light guide 42 includes light-scattering portion 42A that allows some of light 44 to escape from light guide 42 and non-scattering portion 42B that propagates light 44 while containing light 44 in light guide 42. Non-scattering portion 42B may be coupled to scattering portion 42A (e.g., via fusion splicing, mechanical splicing, or other coupling methods).

One end of light guide 42 such as end 92 may receive light 44 from light source 56. The opposing end of light guide 42 such as end 94 may have a reflective coating such as reflective coating 58. Reflective coating 58 may be formed from metal such as gold, silver, chrome, aluminum, or other metal, or may be formed from any other reflective material. Any light 44 that does not escape from scattering portion 42A of light guide 42 on its first pass through scattering portion 42A may be reflected at coating 58 so that it passes back through light-scattering portion 42A a second time. Additional light 44 may escape from light guide 42 after it is reflected back from coating 58, thereby increasing the uniformity of light from light guide 42 and improving light extraction efficiency.

Figure 13:
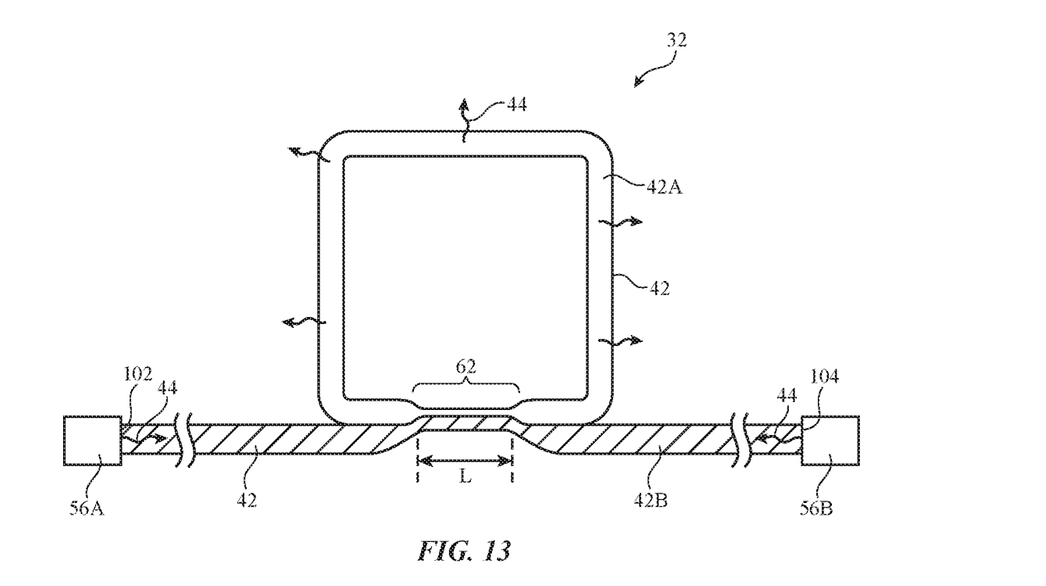
FIG. 13 is a front view of an illustrative illumination system in which a tapered portion of a first optical fiber is fused to a tapered portion of a second optical fiber to form an optical coupler in accordance with an embodiment.

FIG. 13 shows an example in which first and second fibers 42A and 42B are optically coupled to produce a continuous illuminated loop. As shown in FIG. 13, fiber 42B may have opposing ends 102 and 104. End 102 of light guide 42 may receive light 44 from light source 56A, and end 104 of light guide 42 may receive light 44 from light source 56B. Fiber 42A may a light-scattering fiber that form a continuous loop. Fiber 42B may be a non-scattering fiber that couples light 44 into fiber 42A. In particular, fibers 42A and 42B may have portions that form an optical coupler such as optical coupler 62.

In the example of FIG. 13, optical coupler 62 is a fused biconical tapered coupler that is formed from a tapered region of fiber 42A and a tapered region of fiber 42B that are fused (e.g., melted) together along length L. This is merely illustrative, however. If desired, optical coupler 62 may be formed by twisting fiber 42A and 42B along length L, by tapering fiber 42A and 42B along length L without fusing the fibers together, etc.

In the tapered regions that form optical coupler 62, the respective diameters of fibers 42A and 42B may be reduced relative to the rest of fibers 42A and 42B. The reduced diameters of fibers 42A and 42B and their proximity to one another brings the centers of the two fiber cores closer together, causing light 44 from non-scattering fiber 42B to escape into light-scattering Fiber 42A. This light is then cycled through light-scattering fiber 42A. Because fiber 42A is a continuous loop, the extraction features in fiber 42A and the absence of breaks in fiber 42A cause light 44 to escape from fiber 42A to form a continuous illuminated loop. Meanwhile, fiber 42B is free of light-scattering features, so that fiber 42B is unilluminated (and thus undetectable to users) and the continuous illuminated loop formed by fiber 42A appears to be "floating" in the middle of vehicle structure 40.

The example of FIG. 13 in which fiber 42A forms a rectangular loop with rounded corners is merely illustrative. If desired, fiber 42A may form other loop shapes (e.g., circles, ovals, triangles, other polygons, etc.) or may form non-loop shapes with end portions (e.g., a symbol, letter, word, a set of parallel lines, etc.). Also, the use of two light sources to inject light into fiber 42B is merely illustrative. If desired, fiber 42B may only receive light from one light source. Arrangements in which multiple fibers are used to form multiple optical couplers with light-scattering fiber 42A may also be used.

Figure 14:
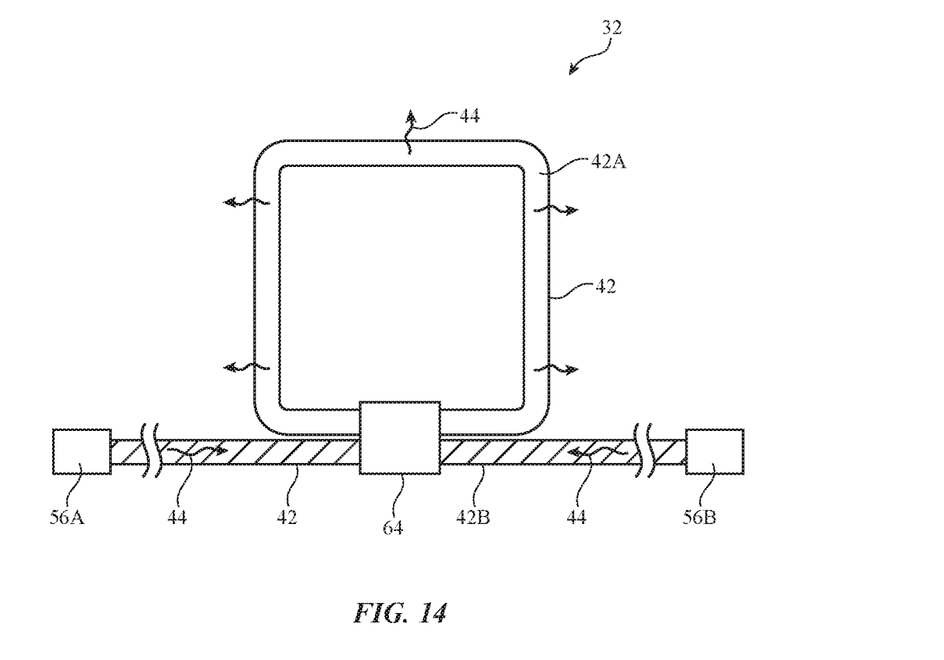
FIG. 14 is a front view of an illustrative illumination system in which an optical coupler is used to couple light from a non-scattering optical fiber into a light-scattering optical fiber in accordance with an embodiment.

FIG. 14 shows an example in which a separate optical coupler such as optical coupler 64 is used to couple light from non-scattering fiber 42B into light-scattering fiber 42A. Optical coupler 64 may be a micro optics coupler (e.g., having one or more prisms, mirrors, and/or other optical elements to redirect light 44 from fiber 42B to fiber 42A), a fused-fiber coupler (e.g., having two or more fiber cores that are melted together to transmit light from one fiber core to another fiber core), a planar waveguide coupler, or other suitable type of optical coupler. In the example of FIG. 14, optical coupler 64 has two inputs receiving light from fiber 42B and two outputs providing light to fiber 42A. This is, however, merely illustrative. If desired, optical coupler 64 may have more than two inputs, less than two inputs, more than two outputs, less than two outputs, etc.

Figure 15:
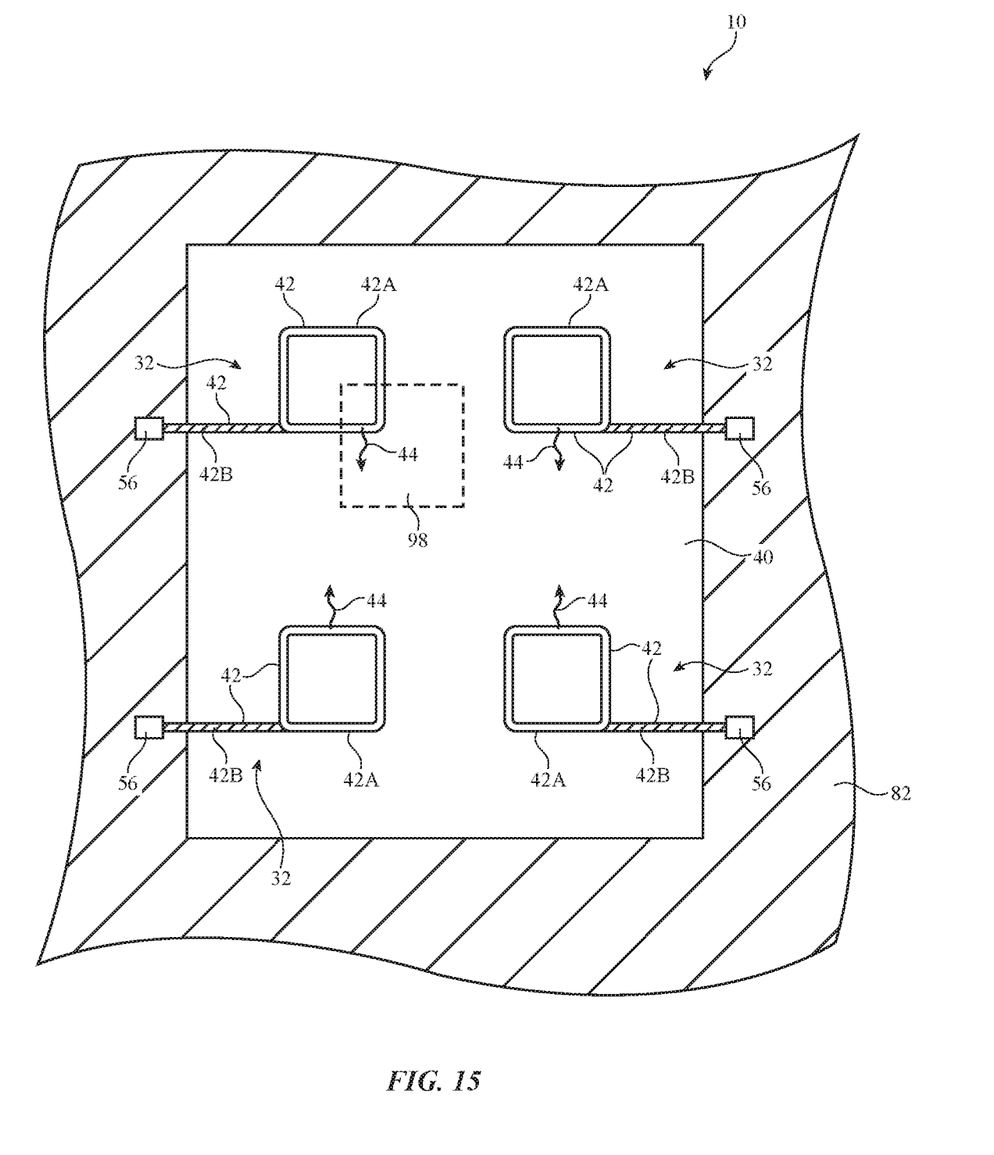
FIG. 15 is a front view of an illustrative vehicle structure having multiple illumination systems in accordance with an embodiment.

If desired, multiple light guides may form multiple illuminated shapes on one vehicle structure in vehicle 10, as shown in FIG. 15. In the example of FIG. 15, four illumination systems 32 are provided on vehicle structure 40. Each illumination system 32 includes a light source 56 that emits light 44 into a non-scattering fiber 42B of light guide 42, which in turn guides light 44 to light-scattering fiber 42A of light guide 42, where it escapes to form an illuminated shape on vehicle structure 40. Because light 44 is guided to light-scattering fiber 42A with a non-scattering fiber 42B, the illuminated shape formed by fiber 42A may appear to be floating in vehicle structure 40. This is merely illustrative, however. If desired, the entirety of light guide 42 may be illuminated (e.g., may be formed entirely from light-scattering fiber 42A).

In configurations where fibers 42A and 42B are index-matched (or nearly index-matched) to polymer layer 50 in vehicle structure 40, a user may be unable to see fibers 42A and 42B in vehicle structure 40. This allows users to see objects such as object 98 through vehicle structure 40 and through unilluminated portions of light guide 42. In other words, vehicle structure 40 may appear to be completely transparent when illumination systems 32 are turned off.

If desired, each illumination system 32 in FIG. 15 may be independently controlled (e.g., each illumination system may receive separate, independent control signals from control circuitry 34 of FIG. 2), or illumination systems 32 may be controlled as a single illumination system that responds to one set of control signals. There may be fewer or more than four illumination systems in vehicle structure 40. The example of FIG. 15 is merely illustrative.

Figure 16:
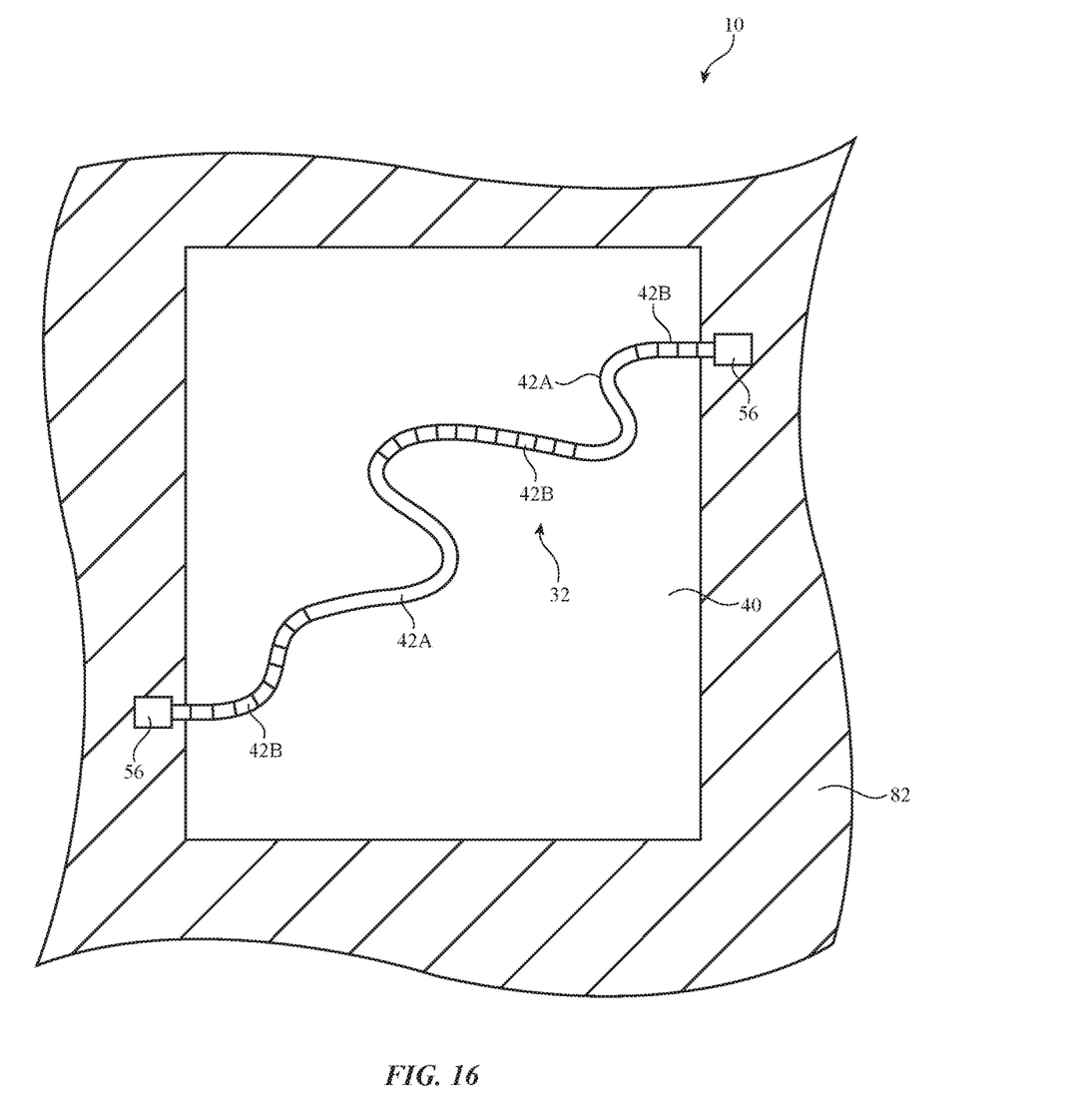
FIG. 16 is a front view of an illustrative vehicle structure having an illumination system with a light guide having multiple light-scattering portions and multiple non-scattering portions in accordance with an embodiment.

Illuminable portions of light guide 42 may have any suitable shape (e.g., loop, spiral, text, symbols, parallel lines, zigzag lines, checker pattern, an array of one or more of these shapes, etc.). As shown in FIG. 16, for example, light guide 42 may have a curvy shape that starts at one edge of vehicle structure 40 and ends on an opposing edge of vehicle structure 40. Light guide 42 may have one, two, three, or more than three light-scattering fibers 42A and one, two, three, or more than three non-scattering fibers 42B. In general, any suitable number and shape of light-scattering portions 42A and non-scattering portions 42B may be used to form the desired illuminated shape or shapes on vehicle structure 40.

Figure 17:
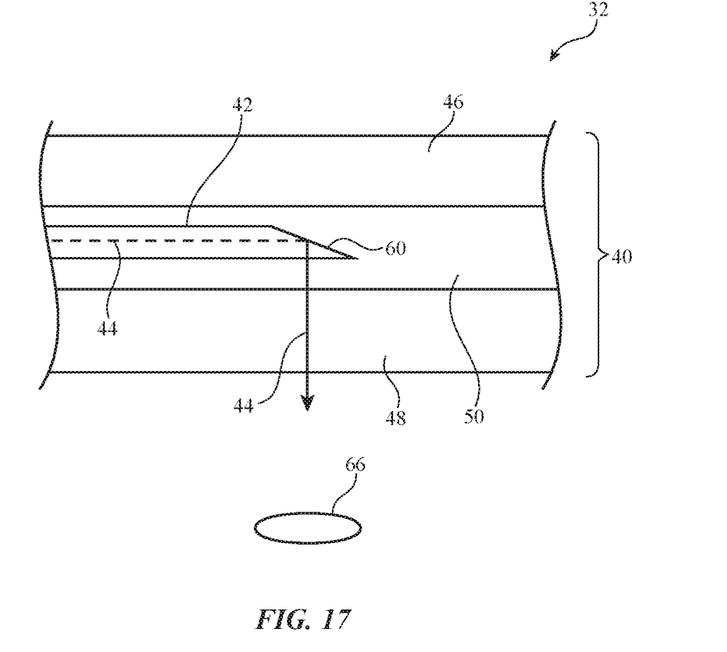
FIG. 17 is a cross-sectional side view of an illustrative illumination system having a light guide with a cleaved end to form a spotlight in accordance with an embodiment.
Figure 18:
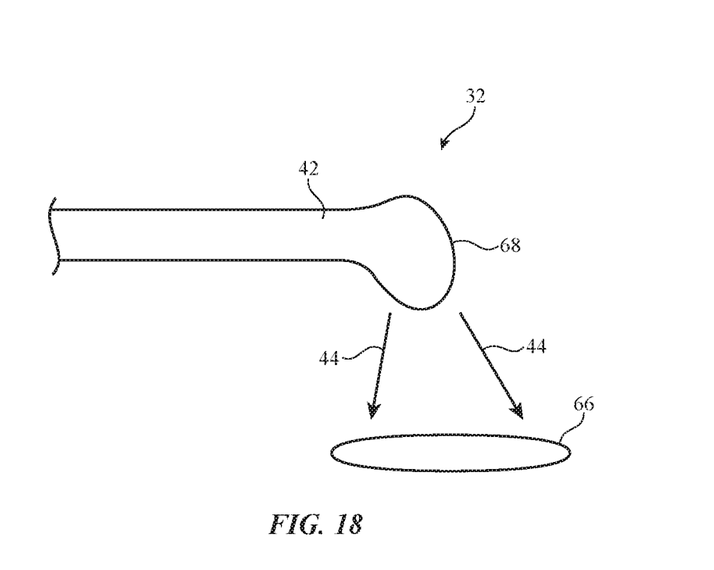
FIG. 18 is a cross-sectional side view of an illustrative illumination system having a light guide with a bulged end to form a spot light in accordance with an embodiment.

FIGS. 17 and 18 show examples in which light guide 42 provides more focused illumination (e.g., to form a spotlight). In the example of FIG. 17, light guide 42 has an angled end such as cleaved end 60 that helps focus light 44 towards area 66 (e.g., an area inside of vehicle 10 or an area outside of vehicle 10). Cleaved end 60 may be reflective or may have a different index of refraction that causes light 44 to exit light guide 42 towards area 66. The shape of cleaved end 60 may help collimate light 44 to form a bright spot in area 66.

In the example of FIG. 18, light guide 42 has an enlarged end such as enlarged end 68. Enlarged end 68 may serve as a lens that helps focus light 44 onto area 66. Enlarged end 68, may, if desired, be formed by melting the end of fiber 42 so that the melted portion of fiber 42 begins to fall into the curved shape of FIG. 18. The bulged shape of end 68 helps to collimate light 44 to form a bright spot in area 66.

The foregoing is merely illustrative and various modifications can be made by those skilled in the art without departing from the scope and spirit of the described embodiments. The foregoing embodiments may be implemented individually or in any combination.

What is claimed is:

1. A system comprising:
   first and second layers;
   a first light guide interposed between the first and second layers;
   a first light source that emits first light into the first light guide, the first light guide being configured to scatter the first light through the first layer;
   a second light guide interposed between the first and second layers;
   a second light source that emits second light into the second light guide, the second light guide being configured to scatter the second light through the first layer; and
   control circuitry configured to independently control the first and second light sources.

2. The system defined in claim 1, further comprising:
   an adhesive layer that attaches the first layer to the second layer, wherein the first and second light guides are embedded in the adhesive layer.

3. The system defined in claim 2, wherein the first light guide is index-matched to the adhesive layer.

4. The system defined in claim 3, wherein the adhesive layer has a first index of refraction and the first light guide has a second index of refraction that is within 40% of the first index of refraction.

5. The system defined in claim 1, wherein the first light guide is visible while the first light source emits the first light and wherein the first light guide is invisible while the first light source is turned off.

6. The system defined in claim 1, wherein the first light guide has a non-planar shape.

7. The system defined in claim 1, wherein the control circuitry is configured to convey information by independently activating the first and second light sources.

8. The system defined in claim 1, further comprising:
   a vehicle body; and
   a window mounted to the vehicle body, wherein the window comprises the first layer, the second layer, the first light guide, and the second light guide.

9. The illumination system defined in claim 8, wherein the first light guide has a curved shape.

10. An illumination system comprising:
    first and second layers;
    first and second light guides interposed between the first and second layers;
    a light source that emits light into the first light guide; and
    an optical coupler configured to couple the light from the first light guide into the second light guide, wherein the second light guide is configured to scatter the light through the first layer.

11. The illumination system defined in claim 10, wherein the first light guide is unilluminated while the light source emits the light and wherein the second light guide is illuminated while the light source emits the light.

12. The illumination system defined in claim 11, wherein the second light guide comprises light extraction features configured to scatter the light.

13. The illumination system defined in claim 11 further comprising:
    a polymer layer that attaches the first layer to the second layer, wherein the first and second light guides are embedded in the polymer layer.

14. The illumination system defined in claim 10, wherein the optical coupler comprises a tapered portion of the first light guide and a tapered portion of the second light guide that overlaps the tapered portion of the first light guide.

15. The illumination system defined in claim 10, wherein the optical coupler comprises an optical coupler selected from the group consisting of: a micro optics coupler, a fused-fiber coupler, and a planar waveguide coupler.

16. A system comprising:
    first and second layers;
    a polymer layer interposed between the first and second layers;
    a light guide in the polymer layer; and
    a light source configured to emit light into the light guide, wherein the light guide extends along a non-linear path and wherein a portion of the light guide has extraction features configured to scatter the light through the first layer.

17. The system defined in claim 16, wherein the light guide comprises a first additional portion with additional extraction features configured to scatter the light through the first layer, the first additional portion of the light guide being separated from the portion of the light guide by a second additional portion of the light guide that is free from light extraction features.

18. The system defined in claim 16, wherein the polymer layer has a first index of refraction and the portion of the light guide has a second index of refraction that is within 40% of the first index of refraction.

19. The system defined in claim 18, wherein the portion of the light guide is invisible while the light source is turned off.

20. The system defined in claim 16, wherein the light guide has an end with a bulged shape that is configured to form a lens that focuses the scattered light.

* * * * *